US011030671B1

(12) United States Patent
Salatandre

(10) Patent No.: US 11,030,671 B1
(45) Date of Patent: Jun. 8, 2021

(54) METHOD FOR IMPROVING RETAIL EFFICIENCY

(71) Applicant: Edgar Davin Salatandre, Toronto (CA)

(72) Inventor: Edgar Davin Salatandre, Toronto (CA)

( * ) Notice: Subject to any disclaimer, the term of this patent is extended or adjusted under 35 U.S.C. 154(b) by 555 days.

(21) Appl. No.: 14/515,013

(22) Filed: Oct. 15, 2014

Related U.S. Application Data

(60) Provisional application No. 61/891,016, filed on Oct. 15, 2013.

(51) Int. Cl.
*G06Q 30/06* (2012.01)
*G06Q 30/00* (2012.01)

(52) U.S. Cl.
CPC ......... *G06Q 30/0633* (2013.01); *G06Q 30/00* (2013.01); *G06Q 30/06* (2013.01)

(58) Field of Classification Search
CPC ............. G06Q 30/0633; G06Q 30/0601–0645
USPC .................................... 705/26.61, 26.1–27.2
See application file for complete search history.

(56) References Cited

U.S. PATENT DOCUMENTS

| | | | | |
|---|---|---|---|---|
| 8,924,262 | B2* | 12/2014 | Shuster | G06Q 30/0601 221/7 |
| 9,286,613 | B2* | 3/2016 | Pilu | G06Q 30/0633 |
| 9,959,565 | B2* | 5/2018 | Shuster | G06Q 30/0633 |
| 2006/0178943 | A1* | 8/2006 | Rollinson | G06Q 30/0601 705/26.1 |
| 2008/0070569 | A1* | 3/2008 | Shelley | G06Q 30/06 455/426.2 |
| 2013/0041775 | A1* | 2/2013 | Rosenberg | H04B 5/0056 705/26.9 |
| 2013/0159124 | A1* | 6/2013 | Gallo | H04W 4/001 705/26.1 |
| 2013/0218727 | A1* | 8/2013 | Lutnick | G06Q 30/06 705/26.81 |
| 2014/0258127 | A1* | 9/2014 | Chava | G06Q 20/3276 705/44 |

OTHER PUBLICATIONS

Sarah Clark, "Turkcell launches NFC home shopping service" Jul. 16, 2012. Acessed Apr. 18, 2017. https://www.nfcworld.com/2012/07/16/316891/turkcell-launches-nfc-home-shopping-service/.*
"TNO Information and Communication Technology, TNO Whitepaper, Beyond RFID: the NFC Security Landscape." By Jaap-Henk Hoepman and Johanneke Siljee. Oct. 23, 2007. (Year: 2007).*
Lydia Majure et al, "NFC-Enabled Menu Ordering System" Apr. 30, 2013, ECE 445 (Year: 2013).*

* cited by examiner

*Primary Examiner* — Allison G Wood
*Assistant Examiner* — Jason B Warren
(74) *Attorney, Agent, or Firm* — Head, Johnson, Kachigian & Wilkinson, PC

(57) ABSTRACT

The method, which is for use by a business of the type having patrons which at least periodically place the same order by smart phone or similar device, comprises the steps of: including, as part of the fulfillment of an order placed via a smart phone or similar device, a near-field communication interface; associating the order with at least one of the near-field communication interface and the device which placed the order; and operating a fulfillment system in a manner such that, if an interface is activated with the device that placed the order in which the interface was included, the system facilitates a repeat of that order.

15 Claims, 3 Drawing Sheets

METHOD FOR IMPROVING RETAIL EFFICIENCY

CROSS-REFERENCE TO RELATED APPLICATIONS

This application claims priority to U.S. Provisional Patent Application Ser. No. 61/891,016, filed Oct. 15, 2013, which is herein incorporated by reference.

BACKGROUND OF THE INVENTION

1. Field of the Invention

The present invention relates to order entry systems.

2. Prior Art

In the service industry, it is desirable to improve process efficiency without degrading the customer experience.

SUMMARY OF THE INVENTION

Forming one aspect of the invention is a method for use by a business of the type having patrons which at least periodically place the same order by smart phone or similar device. The method comprises the steps of: including, as part of the fulfillment of an order placed via a smart phone or similar device, a near-field communication interface; associating the order with at least one of the near-field communication interface and the device which placed the order; and operating a fulfillment system in a manner such that, if an interface is activated with the device that placed the order in which the interface was included, the system facilitates a repeat of that order.

According to another aspect of the invention: the order can be associated with the near-field communication interface; the near-field communication interfaces are drawn from an inventory maintained by the business, each interface being unique; and the association step can involve the identification of an interface drawn from inventory and the creation of a data field in a look-up table.

According to another aspect of the invention, if the interface is activated via any device, the system can facilitate a repeat of the order associated with the interface.

According to another aspect of the invention: the look-up table can be populated with information about orders and, if available, the devices by which they were placed; activation of an interface by a device which is known to have placed the order in which the interface was included can be treated as a repeat of that order; and activation of an interface by a device which is not known to be the device which placed the order in which the interface was included can result in a query to the device that activated the interface.

According to another aspect of the invention, as part of the fulfillment of every order, a near-field communication interface can be enclosed.

According to another aspect of the invention, as part of the fulfillment of every order other than a repeat order facilitated by activation of an interface, a near-field communication interface can be enclosed.

According to another aspect of the invention, wherein, in respect of any order in which a near-field communication interface is enclosed, a sticker providing details of the order can be included.

According to another aspect of the invention: the look-up table can be populated with information about orders and, if available, the devices by which they were placed; activation of an interface by a device which is known to have placed the order in which the interface was included can be treated as a repeat of that order; and activation of an interface by a device which is not known to be the device which placed the order in which the interface was included can result in a query to the device that activated the interface.

According to another aspect of the invention, the orders can be associated with the devices which place the orders.

According to another aspect of the invention, if an interface is activated by a device in respect of which an order has been associated, the system can facilitate a repeat of the order.

According to another aspect of the invention, if an interface is activated by a device in respect of which an order is associated, the activation can be treated as a repeat of that order.

According to another aspect of the invention, activation of an interface by a device in respect of which no order has been associated can result in a query to the device that activated the interface.

According to another aspect of the invention, wherein the fulfillment system can collect details of devices placing orders and, when an order is placed via a device that has not previously placed an order, can automatically associate the order placed with the device.

According to another aspect of the invention, the fulfillment system can collect details of devices placing orders and, when an order is placed via a device that has previously placed an order but otherwise than as a result of an interface activation, inquire if the order associated with the device should be updated.

According to another aspect of the invention, the fulfillment system can collect details of devices placing orders and, when an order is placed via a device that has previously placed an order but otherwise than as a result of an interface activation, automatically update the order placed with the device.

According to another aspect of the invention, as part of the fulfillment of every order, a near-field communication interface can be enclosed.

According to another aspect of the invention, as part of the fulfillment of every order other than those precipitated by activation of an interface, a near-field communication interface can be enclosed.

According to another aspect of the invention, the near-field communication interfaces can be defined by refrigerator magnets.

Advantages, features and characteristics of the present invention will become apparent upon a review of the following detailed description with reference to the appended claims and drawings, the latter being briefly described hereinafter.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The above mentioned three exemplary embodiments of the present invention are hereinafter described in detail.

All relate to methods for use by a business of the type having patrons which at least periodically place the same order by smart phone or similar device. Businesses of this general type include, for example, pizza delivery businesses and cab companies.

All exemplary methods also include the steps of:
including, as part of the fulfillment of an order placed via a smart phone or similar device, a near-field communication interface;
associating the order with at least one of the near-field communication interface and the device which placed the order; and
operating a fulfillment system in a manner such that, at least if an interface is activated with the device that placed or was otherwise associated with the order in which the interface was included, the system facilitates a repeat of that order.

First Embodiment—Tap to Text—Specific Reorder

In the first exemplary embodiment:
the order is associated with the near-field communication interface;
the near-field communication interfaces are drawn from an inventory maintained by the business, each interface bearing a unique visual code and an unique machine readable code, these codes and the relationship therebetween being maintained in a database;
the association step involves the identification of an interface drawn from inventory and the creation of a data field in a look-up table.

Figure 1:
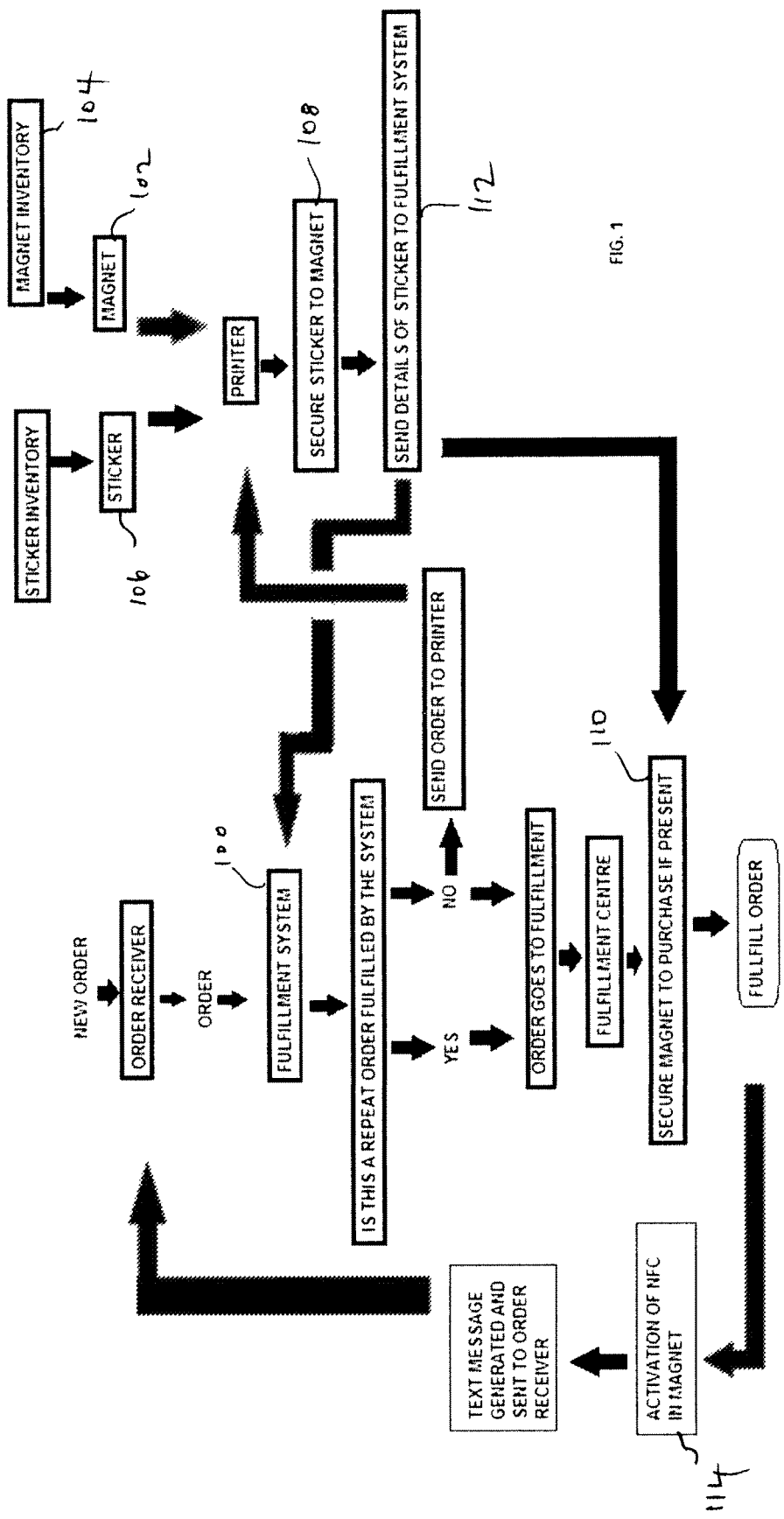
FIG. 1 is a schematic view of the steps of a method according to a first exemplary embodiment.

Reference is made to FIG. 1.

In this embodiment, there is employed a fulfilment system 100 in which details of orders and customer information can be collected. This is generally conventional and used, for example, by many pizza delivery businesses. As well, the system will make allowance for the entry of further data fields, including, at least, an identifier code and a mobile phone number. The mobile phone number will be collected, when available, as part of the order-taking process. Making allowances for further data fields in a CRM database is a matter of routine to persons of ordinary skill in the art and as such, further detail is neither required nor provided. In use of this embodiment, the NFC interfaces are embodied as refrigerator magnets. As part of the fulfillment of every order [other than a repeat order facilitated by activation of an interface, as discussed below], for example, as each pizza order is packaged for delivery, a member of the restaurant staff will:
retrieve one of the magnets 102 from the inventory 104;
print out a sticker 106 bearing details of the order and secure it 108 to the magnet;
secure the magnet and sticker to the order/purchase in a suitable manner 110, such as by securing the magnet and sticker by tape to a pizza carton; and
enter 112 the visual code of the NFC device into the "identifier code" field.

In use, if the interface is activated 114 via any smart phone or similar, the system facilitates a repeat of the order associated with the interface, i.e. by loading, into the text message application of the device, a text message to a phone system associated with the retailer that signifies that the previous order is to be resent. The text message will contain the unique machine readable code embedded in the NFC device. On receipt of the text message, the machine readable code can be cross-referenced by, for example, the phone system, or manually, with the cell phone number; if the machine readable code pertains to an NFC device that accompanied an order to which the cell phone number is associated in the CRM, the authenticity of the message is relatively assured, and the order can be prudently sent without further inquiry. If the order was sent by a different phone, the retailer may, for example, call the activating phone to check authenticity of the order.

Without intending to be bound by theory, it is believed that the foregoing will provide great advantage in the context of improving retail efficiencies: over time, customers will collect refrigerator magnets associated with favorite orders and, rather than occupying call-centre time while placing orders, will simply activate the appropriate NFC chipset. An advantage of this manual-entry system is that it may be possible to avoid the need for software and hardware changes at the retail level; to carry out this embodiment with some utility, all the retailer really requires in terms of computing functionality is a phone capable of reading incoming text messages.

Second Embodiment—Tap to Web

Figure 2:
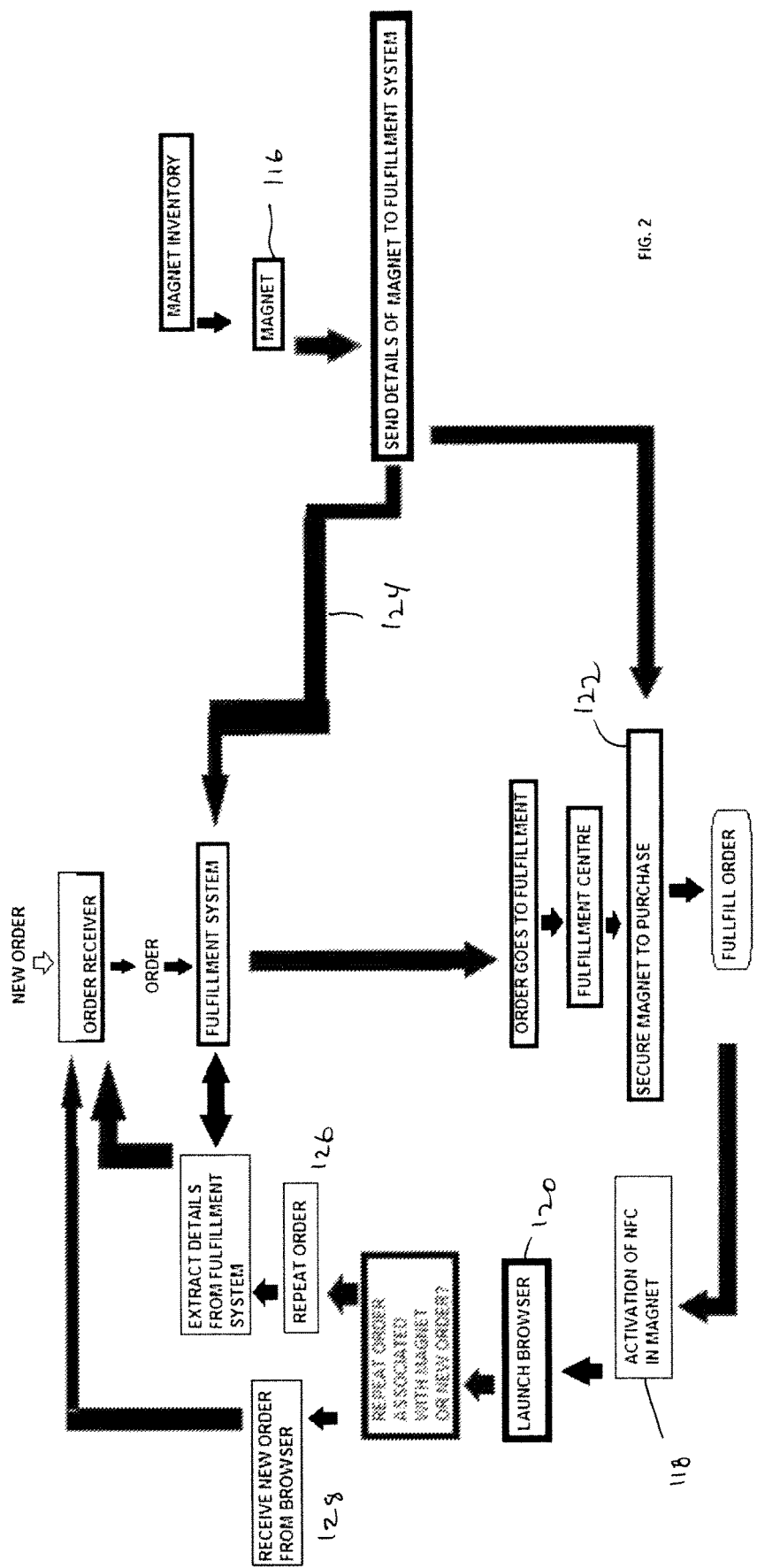
FIG. 2 is a schematic view of the steps of a method according to a second exemplary embodiment.

Reference is now made to FIG. 2. In the second embodiment, NFC fridge magnets are again employed 116. However, activation 118 of an interface by a device causes the device to automatically launch 120 an internet browser on the device with a special URL containing a unique ID.

Orders are again taken in a conventional manner, but herein, one of the NFC devices is distributed 122 with each order, and the NFC device included with the order is associated 124 with the order. This can be done via a computing facility, that activates and reads the NFC device and autopopulates the database as part of the order fulfilment process, or it can be done in the general manner previously discussed, namely, the NFC devices can have unique visual codes thereon which are entered by hand as part of the fulfilment process and which can be cross-referenced to the unique ID/special URL.

Herein, if an interface is activated by a device, the interface automatically launches an internet browser on the device with the special URL, which causes the browser to visit a web page operated by the retailer which presents to the visitor the option to:
repeat the order 126 which the NFC interface accompanied [the details of the order being auto-extracted from the CRM database by cross-referencing the unique ID]; or
make 128 a new order.

Third Embodiment—Tap to Text—Dynamic Reorder

Figure 3:
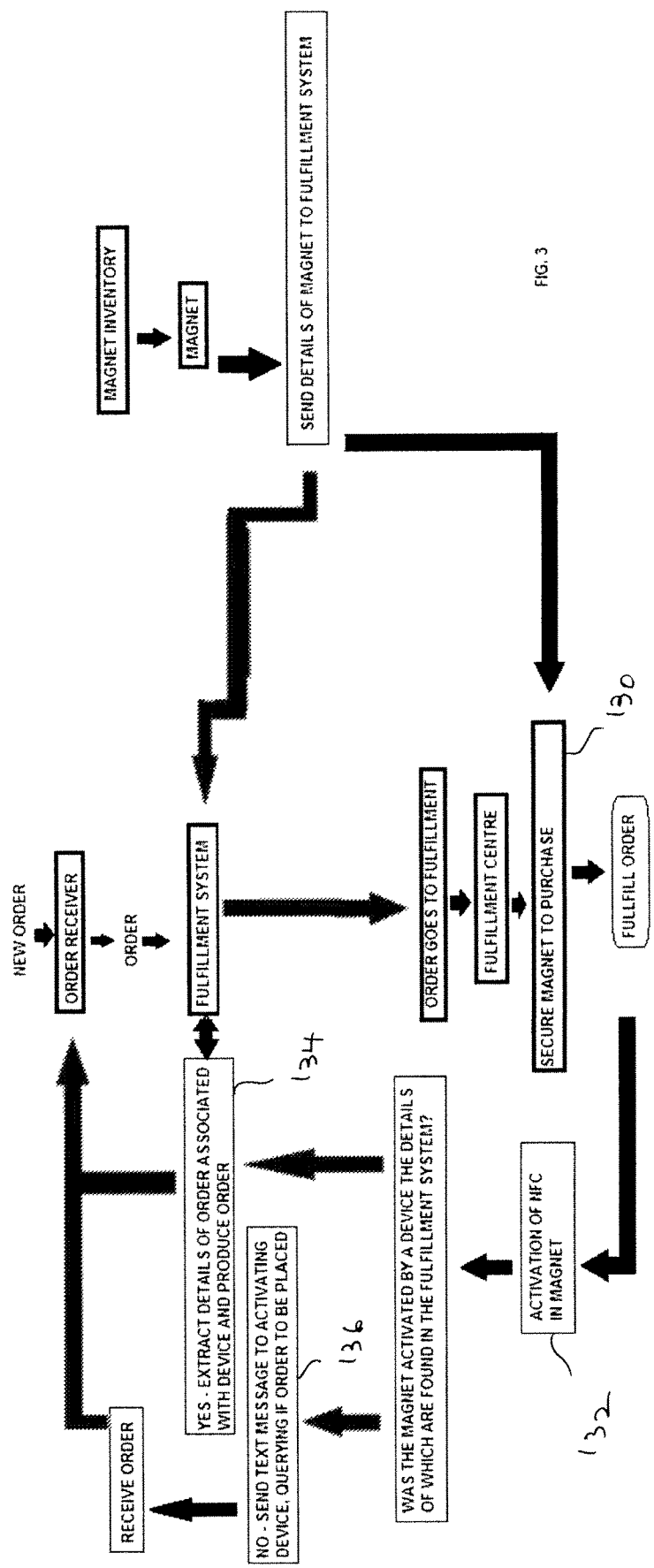
FIG. 3 is a schematic view of the steps of a method according to a third exemplary embodiment.

The third embodiment shown schematically in FIG. 3 uses devices generally similar to those of the first embodiment, but (i) devices are included 130 with every order fulfilment and associated with a delivery address and (ii) no stickers are utilized. Thereafter, upon activation 132 of an interface by a device, the system facilitates 134 a repeat order:

to the address in respect of which the order in respect of which that interface was included as part of the fulfilment process; and based on the last order associated with the activating device, if any.

If the interface is activated by a device that is not in the CRM, a return text message may be sent to the activation device 136, and querying if an order is to be placed.

Further Variations

Whereas specific embodiments have been described, it will be evident that variations are possible.

For example, whereas refrigerator magnets are specified, the invention could be embodied, for example, in business cards or stickers.

Further, whereas it was mentioned that, in the context of orders which are associated with the devices which place the orders, interfaces would be delivered with every order, this is not necessary and for reasons of economy, it might be advantageous in some situations for the interfaces to be included as part of fulfillment only in the context of orders that result otherwise than from an interface activation.

Further, in the context of orders which are associated with interfaces, there will be situations where orders are received from devices which are already in the system otherwise than via interface activation and interfaces are delivered without stickers; in cases such as these, the fulfillment system may inquire if the order associated with the interface should be updated.

Accordingly, the invention should be understood as limited only by the accompanying claims, purposively construed.

Whereas, the present invention has been described in relation to the drawings attached hereto, it should be understood that other and further modifications, apart from those shown or suggested herein, may be made within the spirit and scope of this invention.

What is claimed is:

1. A method for use by a business of the type that receives orders for customized goods placed by a smart phone or similar device and that fulfills orders for customized goods received by the business by customer pick-up or delivery, the method comprising the steps of:

a drawing step, wherein a near-field communication tag having a unique code is drawn from an inventory of near-field communication tags, each near-field communication tag being unique;

an including step, wherein, as part of the fulfillment of an order placed via a smart phone or similar device for fulfillment by customer pick-up or delivery, the near-field communication tag is included with the goods that are the subject of the order;

an associating step, wherein the order is associated with the unique code of the near-field communication tag, such association including identifying the near-field communication tag and creating a data field in a look-up table, and an activating step, wherein the near field communication tag is activated with the smart phone or similar device that placed the order, wherein the near field communication tag was drawn from inventory and included as part of an order, the smart phone or similar device reads the unique code of the near-field communication tag, the smart phone or similar device transmits a communication identifying the near-field communication tag to the business, the communication is received and identified as a previous order, the previous order is associated with the near-field communication tag in the look-up table, and the previous order is repeated as a repeat order; and wherein the drawing, including and associating steps are followed as part of the fulfillment of every order received by the business other than repeat order.

2. A method according to claim 1, wherein:

the look-up table is populated with information about orders and, if available, the devices by which they were placed;

activation of the near-field communication tag by a device which is known to have placed the order in which the near-field communication tag was included is treated as a repeat of that order; and activation of the near-field communication tag by a device which is not known to be the device which placed the order in which the near-field communication tag was included results in a query to the device that activated the near-field communication tag.

3. A method according to claim 1, wherein, as part of the fulfillment of every order, the near-field communication tag is enclosed.

4. A method according to claim 3, wherein, in respect of any order in which the near-field communication tag is enclosed, a sticker providing details of the order is included.

5. A method according to claim 4, wherein:

the look-up table is populated with information about orders and, if available, the devices by which they were placed;

activation of the near-field communication tag by a device which is known to have placed the order in which the near-field communication tag was included is treated as a repeat of that order; and activation of the near-field communication tag by a device which is not known to be the device which placed the order in which the near-field communication tag was included results in a query to the device that activated the near-field communication tag.

6. A method according to claim 5, wherein activation of the near-field communication tag by a device in respect of which no order has been associated results in a query to the device that activated the near-field communication tag.

7. A method according to claim 5, wherein the fulfillment system collects details of devices placing orders and, when an order is placed via a device that has not previously placed an order, automatically associates the order placed with the device.

8. A method according to claim 5, wherein, as part of the fulfillment of every order, the near-field communication tag is enclosed.

9. A method according to claim 5, wherein, as part of the fulfillment of every order other than those precipitated by activation of an interface, the near-field communication tag is enclosed.

10. A method according to claim 1, wherein the orders are associated with the devices which place the orders.

11. A method according to claim 10, wherein, if the near-field communication tag is activated by a device in respect of which an order has been associated, the activation is treated as a repeat of the order.

12. A method according to claim 10, wherein, if the near-field communication tag is activated by a device in respect of which an order is associated, the activation is treated as a repeat of that order.

13. A method according to claim 12, wherein the fulfillment system collects details of devices placing orders and, when an order is placed via a device that has previously placed an order but otherwise than as a result of the near-field communication tag activation, inquires if the order associated with the device should be updated.

14. A method according to claim 12, wherein the fulfillment system collects details of devices placing orders and, when an order is placed via a device that has previously placed an order but otherwise than as a result of the near-field communication tag activation, automatically updates the order placed with the device.

15. A method according to claim 1, wherein the near-field communication tags are defined by refrigerator magnets.

\* \* \* \* \*